United States Patent
Holmes

(10) Patent No.: US 7,704,176 B2
(45) Date of Patent: Apr. 27, 2010

(54) ELECTRICALLY VARIABLE TRANSMISSION DEVICE USING MULTIPLE PAIRINGS OF ELECTRICAL MACHINES

(75) Inventor: Alan G. Holmes, Clarkston, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 346 days.

(21) Appl. No.: 11/669,393

(22) Filed: Jan. 31, 2007

(65) Prior Publication Data

US 2008/0182694 A1 Jul. 31, 2008

(51) Int. Cl.
*F16H 3/72* (2006.01)
*F16H 3/44* (2006.01)

(52) U.S. Cl. .......................... 475/5; 475/317
(58) Field of Classification Search ............ 475/5, 475/317; 180/65.2–65.4, 65.6–65.7
See application file for complete search history.

(56) References Cited

U.S. PATENT DOCUMENTS

| | | | |
|---|---|---|---|
| 6,491,599 B1 * | 12/2002 | Schmidt | 475/5 |
| 6,527,658 B2 | 3/2003 | Holmes et al. | |
| 6,540,631 B2 | 4/2003 | Holmes | |
| 6,551,208 B1 | 4/2003 | Holmes et al. | |
| 6,852,053 B2 | 2/2005 | Nakano et al. | |
| 6,953,409 B2 | 10/2005 | Schmidt et al. | |
| 7,014,586 B2 | 3/2006 | Randall | |
| 7,341,534 B2 * | 3/2008 | Schmidt | 475/5 |
| 7,341,535 B2 * | 3/2008 | Usoro | 475/5 |
| 7,371,201 B2 * | 5/2008 | Usoro | 475/5 |
| 7,371,202 B2 * | 5/2008 | Usoro | 475/5 |
| 7,422,534 B2 * | 9/2008 | Usoro | 475/5 |
| 7,468,014 B2 * | 12/2008 | Usoro | 475/5 |
| 7,479,080 B2 * | 1/2009 | Usoro | 475/5 |
| 7,479,082 B2 * | 1/2009 | Usoro | 475/5 |
| 7,481,731 B2 * | 1/2009 | Usoro | 475/5 |
| 2002/0142876 A1 | 10/2002 | Holmes et al. | |
| 2003/0203786 A1 | 10/2003 | Bucknor et al. | |
| 2007/0093335 A1 * | 4/2007 | Usoro | 475/5 |
| 2007/0093336 A1 * | 4/2007 | Usoro | 475/5 |
| 2007/0093337 A1 * | 4/2007 | Usoro | 475/5 |
| 2008/0039258 A1 * | 2/2008 | Usoro | 475/5 |
| 2008/0103003 A1 * | 5/2008 | Sah et al. | 475/5 |

* cited by examiner

*Primary Examiner*—Roger Pang

(57) ABSTRACT

There is provided a transmission device having an electrically variable output that employs three electrically powered motor-generators, or machines. The electrically-variable transmission device comprises first, second and third electrical machines coaxial to and coupled to a plurality of planetary gear sets. Each planetary gear set coupled to a main shaft operative to transmit torque therebetween and operative to transmit torque to an output. There is an input mechanically coupled to one of the planetary gear sets. This transmission device can transmit mechanical power with a continuously variable ratio of the input shaft speed to the output shaft speed using two of the electric motors at a time, forming an input-split or either an output-split or a compound-split. A selectively actuable brake device is operative to multiply torque output from the second electrical machine.

17 Claims, 2 Drawing Sheets

ELECTRICALLY VARIABLE TRANSMISSION DEVICE USING MULTIPLE PAIRINGS OF ELECTRICAL MACHINES

TECHNICAL FIELD

This invention pertains generally to an electrically variable transmission system for a powertrain.

BACKGROUND OF THE INVENTION

The statements in this section merely provide background information related to the present disclosure and may not constitute prior art.

Powertrain systems incorporate a plurality of torque-generative devices attached to an electrically variable transmission device for use in vehicle propulsion systems. The torque-generative devices typically include internal combustion engines and electrical machines powered using electrical energy storage devices, e.g., high voltage batteries. Torque outputs of the torque-generative devices are combined in the transmission device to transmit tractive torque to a driveline of the vehicle, and to transmit torque between the various devices and the driveline.

A typical electrically-variable transmission (EVT) splits mechanical power that is transmitted from an input shaft to an output shaft into a mechanical power path and an electrical power path by means of differential gearing. The mechanical power path typically includes gears and may also include clutches. The electrical power path employs electrical power machines, each of which may operate as a torque-generative motor or as an electrical-generative generator. Varying the speed of at least one of these electrical machines varies the transmission speed ratio, i.e., the ratio of input shaft speed to output shaft speed. The EVT can be incorporated into a propulsion system for a hybrid electric vehicle using an electrical energy storage device. A typical hybrid propulsion system uses electrical energy storage devices and an internal combustion engine as power sources. The batteries are connected with the electrical drive units through an electronic control system which manages and distributes power as required. The control system also has connections with the engine and vehicle to determine operating characteristics, or operating demand, permitting operation of the electrical power units as either motors (generating tractive torque) or a generator (generating electrical energy). When operating as a generator, the electrical power unit accepts power from either the vehicle or the engine and stores power in the battery, or provides that power to operate another electrical device or another electrical power unit on the vehicle or on the transmission.

A benefit of having an electrically-variable transmission incorporating more than one mode of operation is that each mode of operation will generally incorporate at least one mechanical point where one of the electrical power units is stationary, thereby reducing the electrical power input and providing a pure mechanical power flow path to improve system efficiency. Operating in more than one mode has required two or more clutches to change the mechanical configuration among the input, output and a single pair of electrical machines. Since an objective of the electrically-variable transmission is overall efficiency, it is advantageous to provide multiple mechanical points at which one of the electrical power units is stationary while minimizing the addition of components which would produce additional mechanical losses, i.e., spin losses, such as clutches, pumps and so on. Thus, an improved electrically variable transmission is now described.

SUMMARY OF THE INVENTION

In accordance with an aspect of the invention, there is provided a transmission device having an electrically variable output that employs three electrically powered motor-generators, or machines. The electrically-variable transmission device comprises first, second and third electrical machines coupled to a plurality of planetary gear sets. Each planetary gear set coupled to a main shaft to transmit torque therebetween and to transmit torque to an output. There is an input mechanically coupled to one of the planetary gear sets. This power split transmission device can transmit mechanical power with a continuously variable ratio of the input shaft speed to the output shaft speed using electric motors two at a time, forming an input-split or either an output-split or a compound-split. A selectively actuable brake device multiplies torque output from the second electrical machine. The second electrical machine transmits torque to the output independently of the input.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the embodiments of which will be described in detail and illustrated in the accompanying drawings which form a part hereof, and wherein.

DETAILED DESCRIPTION OF EMBODIMENTS OF THE INVENTION

Figure 1:
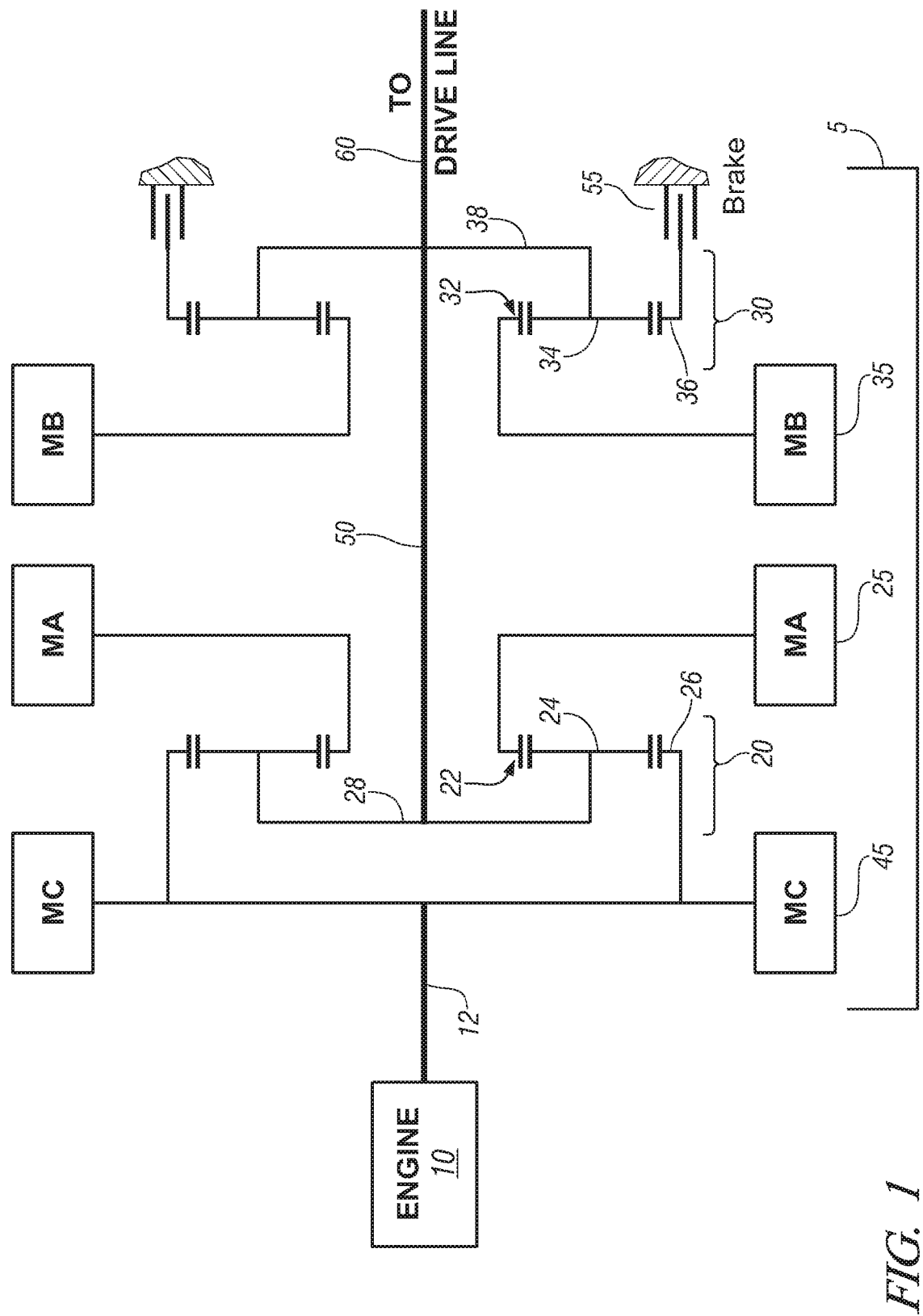
FIGS. 1 and 2 are schematic diagrams of an exemplary powertrain system, in accordance with the present invention.
Figure 2:
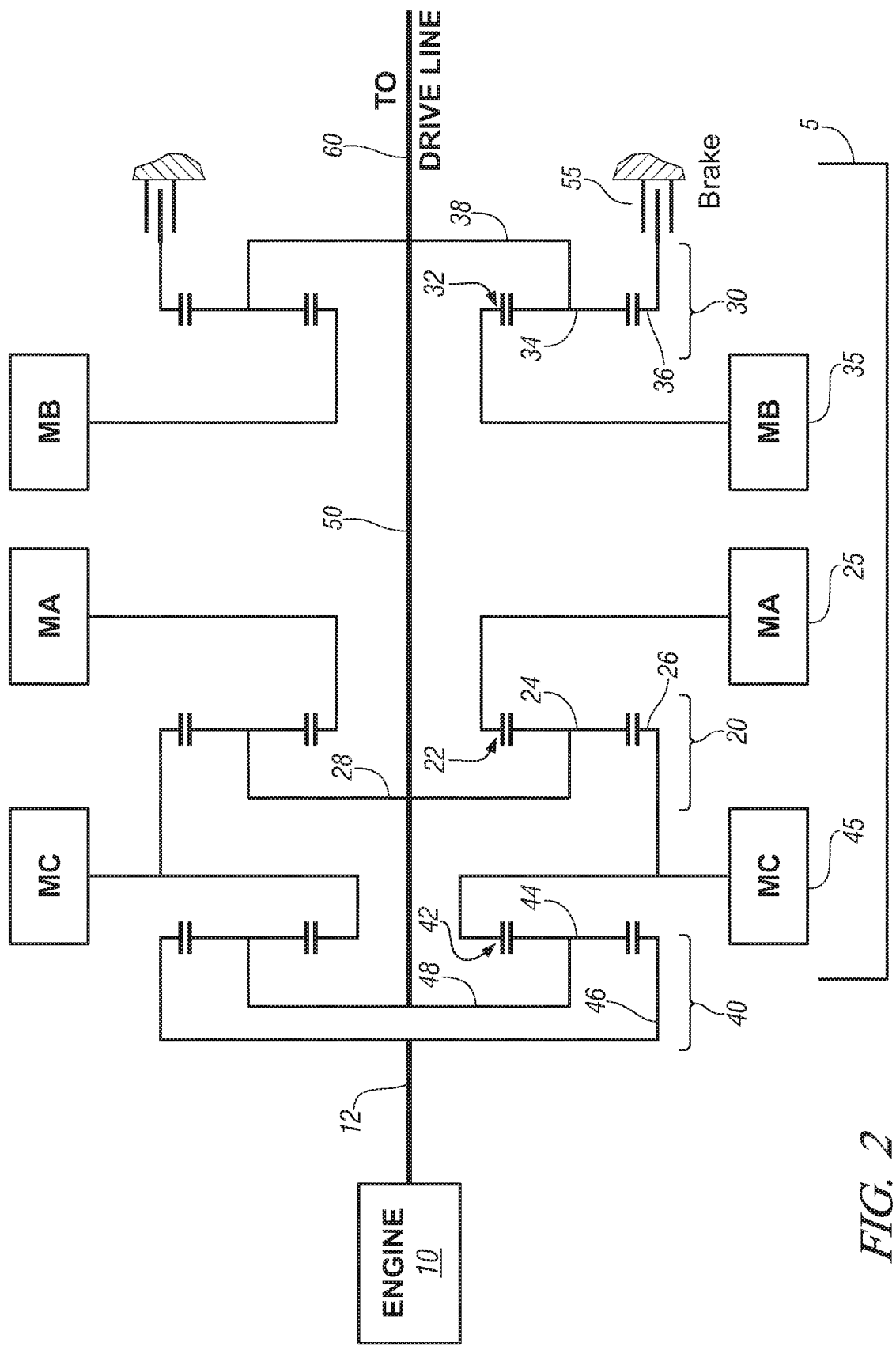

Referring now to the drawings, wherein the showings are for the purpose of illustrating the invention only and not for the purpose of limiting the same, FIGS. 1 and 2 comprise schematic depictions of embodiments of an electro-mechanical transmission device 5 which have been constructed in accordance with the invention. Each embodiment of the transmission device 5 comprises an input shaft 12, a main shaft 50 and an output shaft 60. The transmission further includes first, second and third electrical machines, referred to as MA 25, MB 35, and MC 45, respectively, which are shown coaxial with one another and with said shafts. The electrical machines 25, 35, 45 preferably comprise known three-phase alternating current (AC) electrical machines operative as motor and generator devices. The first, second, and third electrical machines 25, 35, 45 are operable to convert electrical energy to torque which is transmitted to the transmission device 5 and operable to convert torque from the transmission device 5 to electrical energy, based upon control signals and strategies executed in a control system (not shown).

Each electrical machine preferably comprises a stator grounded to a case of the transmission and a rotor device. Differential gearing, i.e., first and second speed ratios, are achieved using planetary gear sets. In the embodiments, there are first and second planetary gear sets 20, 30 coaxial to the main shaft 50 and operatively coupled thereto. There is a third planetary gear set 40 employed in the second embodiment coaxial to the main shaft 50 and operatively coupled thereto, shown with reference to FIG. 2. The second planetary gear set 30 is selectively connected to a brake device 55. The input shaft 12 is preferably mechanically and rotatably coupled to an output shaft of a torque-generative device 10, e.g., an internal combustion engine. The output shaft 60 can be rotatably coupled to an output, e.g., a vehicle driveline comprising some form of conventional differential gearing. The aforementioned components of the electro-mechanical transmission 5 are arranged to transmit torque between the various electrical machines 25, 35, 45, the input shaft 12, and the output shaft 60. The control system preferably comprises a plurality of electronic control modules adapted to control operation of the engine 10 and transmission 5 including the electrical machines through execution of algorithms using predetermined calibrations and information sensed or derived from operation of the engine and transmission. The configuration of the transmission 5 requires only the single clutch, or brake device 55, which can comprise a known hydraulic clutch device. Alternatively, an electric brake device can be utilized to reduce transmission component count, mass and complexity associated with hydraulic clutch devices.

Referring again to FIG. 1, the first embodiment is now described in detail. The first and second planetary gear sets 20, 30 each comprise elements including a ring gear circumscribing a sun gear and a plurality of planet gears mounted therebetween. The planet gears are rotatably mounted on a carrier. The planet gears meshingly engage both the sun gear and the ring gear to transmit torque. The first planetary gear set 20 comprises ring gear 26 circumscribing sun gear 22 and a plurality of planet gears 24 rotatably mounted on carrier 28. The planet gear carrier 28 is coaxial to and rotatably coupled to the main shaft 50. The sun gear 22 is rotatably coupled to the rotor of the first electrical machine MA 25 such that rotation of the first electrical machine rotates the sun gear 22. The ring gear 26 is rotatably coupled to the rotor of the third electrical machine MC 45 which is rotatably coupled to the input shaft 12 to transmit torque therebetween. The second planetary gear set 30 comprises ring gear 36 circumscribing sun gear 32 and the plurality of planet gears 34 rotatably mounted on the carrier 38. The planet gears meshingly engage both the sun gear and the ring gear. The sun gear 32 is coupled to the rotor of the second electrical machine MB 35 such that rotation of the second electrical machine rotates the sun gear 32. The planet gear carrier 38 is rotatably coupled to the shaft 60. The ring gear 36 is selectively engageable by brake 55. By this configuration, as depicted in both FIGS. 1 and 2, the second electrical machine MB transmits torque to the output shaft 60 independently from the input shaft 12, the third electrical machine MC receives torque transmitted from the input shaft 12 independently of the output shaft 60. A speed ratio between the input shaft 12 and the output shaft 60 is regulated and established by operation of the first electrical machine MA, to optimize operation of the transmission and the engine and satisfy an operator torque request.

The three-machine EVT embodied in FIG. 1 forms an input power split arrangement between the first and second electrical machines MA, MB. The brake device 55 causes planetary gear set 30 to multiply torque output from MB 35 when actuated. An output power split arrangement is formed between the first and third electrical machines MA, MC by connecting the third machine MC to the input shaft 12. This arrangement requires only two, simple planetary gear sets to accomplish the power splits, while also providing torque multiplication to the second electrical machine MB. It is apparent that if the second electrical machine MB were coupled directly to the output shaft 60, then both input power split and output power split could be accomplished with the first planetary gear set 20 alone. The first planetary gear set connects to the engine, the first electrical machine and the output shaft, while the second planetary gear set connects to the second machine, the brake, and the output shaft 60. Actuation of the brake 55 allows the second machine to form an input-split and to use the torque multiplication of the second gear set simultaneously, for operation at lower output speeds. At higher output speeds, the machine torque can taper off and the brake can be released, which allows the second machine to spin down or remain at a constant speed, which in turn allows a large gear reduction. Machines MB and MC form a series drive to effect reverse gear.

Referring again to FIG. 2, the second embodiment is now described in detail, with common reference numerals used to identify common elements between the two embodiments. The first and second planetary gear sets 20, 30 and a third planetary gear set 40 each consist of elements comprising a ring gear circumscribing a sun gear and a plurality of planet gears rotatably mounted on a carrier. The planet gears meshingly engage both the sun gear and the ring gear to transmit torque. The first planetary gear set 20 comprises ring gear 26 circumscribing sun gear 22 and planet gears 24 rotatably mounted on carrier 28. The planet gear carrier 28 is rotatably coupled to the main shaft 50. The sun gear 22 is rotatably coupled to the rotor of the first electrical machine MA 25 such that rotation of the first electrical machine rotates the sun gear 22. The ring gear 26 is rotatably coupled to the rotor of the third electrical machine MC 45 which is rotatably coupled to a sun gear 42 of the third planetary gear set 40 to transmit torque therebetween.

The second planetary gear set 30 comprises ring gear 36 circumscribing sun gear 32 and the plurality of planet gears 34 rotatably mounted on the carrier 38. The planet gears meshingly engage both the sun gear and the ring gear. The sun gear 32 is coupled to the rotor of the second electrical machine MB 35 such that rotation of the second electrical machine rotates the sun gear 32. The planet gear carrier 38 is rotatably coupled to the shaft 60. The ring gear 36 is selectively engageable by actuation of the brake device 55.

The input shaft 12 is preferably rotatably coupled to the output shaft of the torque-generative device 10, e.g., the internal combustion engine. The output shaft 60 can be rotatably coupled to an output, e.g., the vehicle driveline. The third planetary gear set 40 is coaxial to the main shaft 50 and operatively connected thereto via a planet gear carrier 48. The third planetary gear set 40 comprises ring gear 46 circumscribing sun gear 42 and a plurality of planet gears 44 rotatably mounted on carrier 48. The planet gear carrier 48 is rotatably coupled to the main shaft 50. The ring gear 46 is rotatably coupled to the input shaft 12 to transmit torque therebetween. Again, the aforementioned elements of the electro-mechanical transmission 5 are arranged to transmit torque between the various electrical machines 25, 35, 45, the input shaft 12, and the output shaft 60.

The three-machine EVT embodied in FIG. 2 forms an input power split arrangement between the second and third machines MB and MC, wherein selective actuation of the brake 55 causes the second planetary gear set 30 to multiply the torque output from the second machine MB 35. A compound-split arrangement is formed between the first and third machines MA and MC, wherein selective deactivation of the brake 55 permits MB to spin freely. The second electrical machine MB is attached to the third sun gear only, and the third electrical machine MC is attached to the second sun gear only. The main shaft 50 is continuously coupled to the output shaft 60. An input-split arrangement can also be formed between the first and second machines MA and MB while brake 55 is actuated.

The transmission device 5 receives input torque from torque-generative devices, including the internal combustion engine 10 and electrical machines 25, 35, 45 as a result of energy conversion from fuel or electrical potential stored in an electrical energy storage device (ESD) 90, typically comprising one or more high voltage batteries. Electrical current is transferable to or from the ESD 90 in accordance with whether the ESD is being charged or discharged.

This invention provides an efficient input-split for driving the output shaft at lower speeds and either the output-split or the compound-split that is more efficient for higher speeds for a given input shaft speed. The input-split causes a power loop for all output speeds above, or all transmission ratios below, the speed or ratio at which MA is stationary, i.e., the mechanical point for MA. In a power loop, the mechanical power path must carry both the transmitted power from input to output and additional mechanical power, because the flow of power through the electrical path is directionally reversed, from the output towards the input. The output-split causes a power loop for all output speeds below, or all transmission ratios above, this speed or ratio. The compound-split may also cause a power loop for the speeds and ratios above and below the range between its two mechanical points. Thus, the exemplary electro-mechanical transmission with an input-split and either an output-split or compound-split can selectively use the input-split for driving the vehicle at low speeds and high transmission ratios and either the output-split or compound-split at high speeds and low transmission ratios by selectively utilizing the appropriate combination of electrical machines. The combination of a compound-split and output-split was considered, but their functions would effectively overlap. The second electrical machine MB can be used to boost the vehicle output torque or provide regenerative braking whenever the output speed and required torque are appropriate, since the power flow differs from that which has been described when using the battery for a substantial amount of the total power.

Operating an embodiment of the invention includes using the first and second machines to deliver power through the electro-mechanical transmission within one range of speed ratios, and the first and third machines to deliver power within a second range of speed ratios. The advantage of this method of operation is that the fraction of power transmitted electrically is, on average over the total range of speed ratios, lower than required for a system using two machines. Since transmitting power electrically is less efficient than transmitting it mechanically, the efficiency of the transmission is improved by the invention. Another advantage is that smaller power capacity is required of the individual machines, resulting in smaller machine size and cost. When the selectable brake is actuated, the second machine delivers power to the transmission output with a torque multiplication through the planetary gear set and reaction torque provided by actuation of the brake. The first and third machines can be coupled either to a single planetary gear set having three coaxially rotating elements (as shown in FIG. 1) or to a compounded planetary gear sets having more than three of these elements (as shown in FIG. 2).

The first and third planetary gear sets separate power flow through the transmission into two power paths from the input 12 and the output 60. One power path goes through the electrical machines, and comprises an electro-mechanical or "electrical" power path. The other power path comprises an entirely mechanical power path through the gears shafts of the transmission. The first and third planetary gear sets kinematically (i.e., by speed) split power mechanically, in close association with the input, the output, or both input and output, forming an input-split, output-split, or compound-split arrangement, respectively. In an input-split arrangement, the second machine supplies or draws mechanical power which is delivered or absorbed at a speed that is directly proportional to the output speed and unaffected by the input speed. In an output-split arrangement, the third machine draws or supplies mechanical power at a speed that is directly proportional to the input speed and unaffected by the output speed. In a compound-split arrangement, the first and third machines each have speeds that are each a linear combination of both the input speed and the output speed.

The invention has been described with specific reference to the embodiments and modifications thereto. Further modifications and alterations may occur to others upon reading and understanding the specification. It is intended to include all such modifications and alterations insofar as they come within the scope of the invention.

The invention claimed is:

1. An electrically-variable transmission device, comprising:
   first, second, and third electrical machines coupled to elements of a plurality of planetary gear sets and an element of each planetary gear set coupled to a main shaft to transmit torque therebetween and to an output;
   an input mechanically coupled to one of the planetary gear sets;
   the first electrical machine operative to regulate a speed ratio between the input and the output;
   the second electrical machine operative to transmit torque to the output independently of the input;
   the third electrical machine coupled to an element of one of the planetary gear sets separate from the first and second electrical machines and the output; and
   an actuable brake device selectively operative to multiply the torque output from the second electrical machine through a second planetary gear set for application to the output.

2. The electrically-variable transmission device of claim 1, comprising the first electrical machine coaxial with and mechanically coupled to a sun gear of a first planetary gear set and the second electrical machine coaxial with and mechanically coupled to a sun gear of the second planetary gear set.

3. The electrically-variable transmission device of claim 2, further comprising a brake device selectively engageable to a ring gear of the second planetary gear set and a planet carrier of the second planetary gear set mechanically coupled to the main shaft.

4. The electrically-variable transmission device of claim 2, comprising the third electrical machine coaxial with and mechanically coupled to a ring gear of the first planetary gear set and a planet carrier of the first planetary gear set mechanically coupled to the main shaft.

5. The electrically-variable transmission device of claim 4 comprising the third electrical machine mechanically coupled to the input.

6. The electrically-variable transmission device of claim 4, comprising the third electrical machine mechanically coupled to a sun gear of a third planetary gear set.

7. The electrically-variable transmission device of claim 6, wherein the first and third planetary gear sets comprise a single compound planetary gear set.

8. The electrically-variable transmission device of claim 6, wherein the first and third planetary gear sets each comprises a simple planetary gear set.

9. The electrically-variable transmission device of claim 1, wherein the actuable brake device selectively operative to multiply the torque output from the second electrical machine through the second planetary gear set for application to the output comprises: the brake selectively actuable to ground a ring gear of the second planetary gear set.

10. The electrically-variable transmission device of claim 9, wherein the brake device comprises an electrically actuable clutch.

11. The electrically-variable transmission device of claim 1, wherein the input comprises an input shaft adapted to transmit torque from an internal combustion engine, and, the output comprises an output shaft adapted to transmit torque to a driveline.

12. The electrically-variable transmission device of claim 1, wherein the electrical machines comprise electrical motor/generator devices.

13. The electrically-variable transmission device of claim 12, wherein the electrical machines are selectively operative to generate electrical energy and generate tractive torque.

14. The electrically-variable transmission device of claim 1, comprising the first and second electrical machines operative to transmit torque to the output within a first speed ratio in an input-split arrangement; and, the first and third electrical machines operative to transmit torque to the output within a second speed ratio in one of an output-split arrangement and a compound-split arrangement.

15. An electrically-variable transmission device comprising:
first, second and third electrical machines coaxially coupled to a plurality of planetary gear sets each planetary gear set attached to a main shaft to transmit torque therebetween and to transmit torque to an output;
an input mechanically coupled to the third electrical machine and adapted to transmit input torque thereto from an internal combustion engine;
the output adapted to transmit torque to a driveline;
the first and second electrical machines forming an input power split wherein the second electrical machine is operative to transmit torque to the output independent of input torque; and,
wherein the first and second electrical machines forming the input power split through selective actuation of a brake device operative to ground an element of a planetary gear set coupled to the second electrical machine.

16. The electrically variable transmission device of claim 15, wherein the input torque to the third electrical machine is independent of the output torque to the driveline.

17. A powertrain system, comprising:
an internal combustion engine operatively coupled to an electrically-variable transmission device operatively coupled to a driveline and operative to transmit torque therebetween;
the electrically-variable transmission device comprising first, second and third electrical machines coaxial to and coupled to a plurality of planetary gear sets each planetary gear set coupled to a main shaft operative to transmit torque therebetween and operative to transmit torque to an output mechanically coupled to the driveline;
an input from the internal combustion engine mechanically coupled to the third electrical machine and operative to transmit torque to one of the planetary gear sets;
a selectively actuable brake device operative to multiply torque output from the second electrical machine; and,
the second electrical machine operative to transmit torque to the output independently of the input.

* * * * *